US008635755B2

(12) United States Patent
Brudermann et al.

(10) Patent No.: US 8,635,755 B2
(45) Date of Patent: Jan. 28, 2014

(54) METHOD FOR PRODUCING DOCTOR BLADES

(75) Inventors: Hans Jörg Brudermann, Zollikofen (CH); Peter Daetwyler, Langenthal (CH)

(73) Assignee: Daetwyler Swisstec AG, Bleienbach (CH)

( * ) Notice: Subject to any disclaimer, the term of this patent is extended or adjusted under 35 U.S.C. 154(b) by 925 days.

(21) Appl. No.: 12/758,884

(22) Filed: Apr. 13, 2010

(65) Prior Publication Data

US 2011/0247512 A1 Oct. 13, 2011

(51) Int. Cl.
*B23P 15/44* (2006.01)

(52) U.S. Cl.
USPC .................. 29/414; 29/412; 76/101.1

(58) Field of Classification Search
USPC ........ 29/412, 413, 414, 415; 76/101.1, 104.1, 76/106.5, 109, 112, 116, 118, 119
See application file for complete search history.

(56) References Cited

U.S. PATENT DOCUMENTS

| 155,180 | A | * | 9/1874 | Coes | 29/414 |
| 1,138,211 | A | * | 5/1915 | Grahamn | 59/77 |
| 1,522,888 | A | * | 1/1925 | Johnson | 76/101.1 |
| 2,565,552 | A | * | 8/1951 | Ern, Jr. | 76/106.5 |
| 3,611,841 | A | | 10/1971 | Froden et al. | |
| 6,027,614 | A | | 2/2000 | Parker et al. | |
| 6,308,391 | B1 | * | 10/2001 | Blaimschein et al. | 29/412 |
| 6,820,316 | B2 | * | 11/2004 | Rata | 29/415 |
| 7,578,217 | B2 | * | 8/2009 | Hobbs et al. | 76/116 |
| 7,685,937 | B2 | * | 3/2010 | Karioja et al. | 101/157 |
| 7,722,697 | B2 | | 5/2010 | Daxelmuller et al. | |
| 8,061,237 | B2 | * | 11/2011 | Hobbs et al. | 76/101.1 |
| 2007/0089567 | A1 | * | 4/2007 | Li et al. | 76/116 |
| 2008/0096037 | A1 | | 4/2008 | Daxelmuller et al. | |

FOREIGN PATENT DOCUMENTS

| DE | 1807325 A1 | 6/1969 |
| EP | 0672761 | 9/1995 |
| EP | 1182293 | 2/2002 |
| GB | 1289609 A | 9/1972 |
| JP | 50-052682 | 5/1975 |
| JP | 07-268542 | 10/1995 |
| JP | 11-138740 | 5/1999 |

* cited by examiner

*Primary Examiner* — David Bryant
*Assistant Examiner* — Jason L Vaughan
(74) *Attorney, Agent, or Firm* — Jacox, Meckstroth & Jenkins

(57) ABSTRACT

A method for producing doctor blades from metal, in particular from steel, the doctor blades to be produced having a reduced material thickness in a region of a working edge. The material thickness is essentially constant in the region of reduced material thickness. By a planing operation being used upon a basic body with an essentially constant material thickness, the region of reduced material thickness is generated. By the region of reduced material thickness being generated by means of a planing operation, an efficient and cost-effective method for the production of doctor blades is achieved.

12 Claims, 3 Drawing Sheets

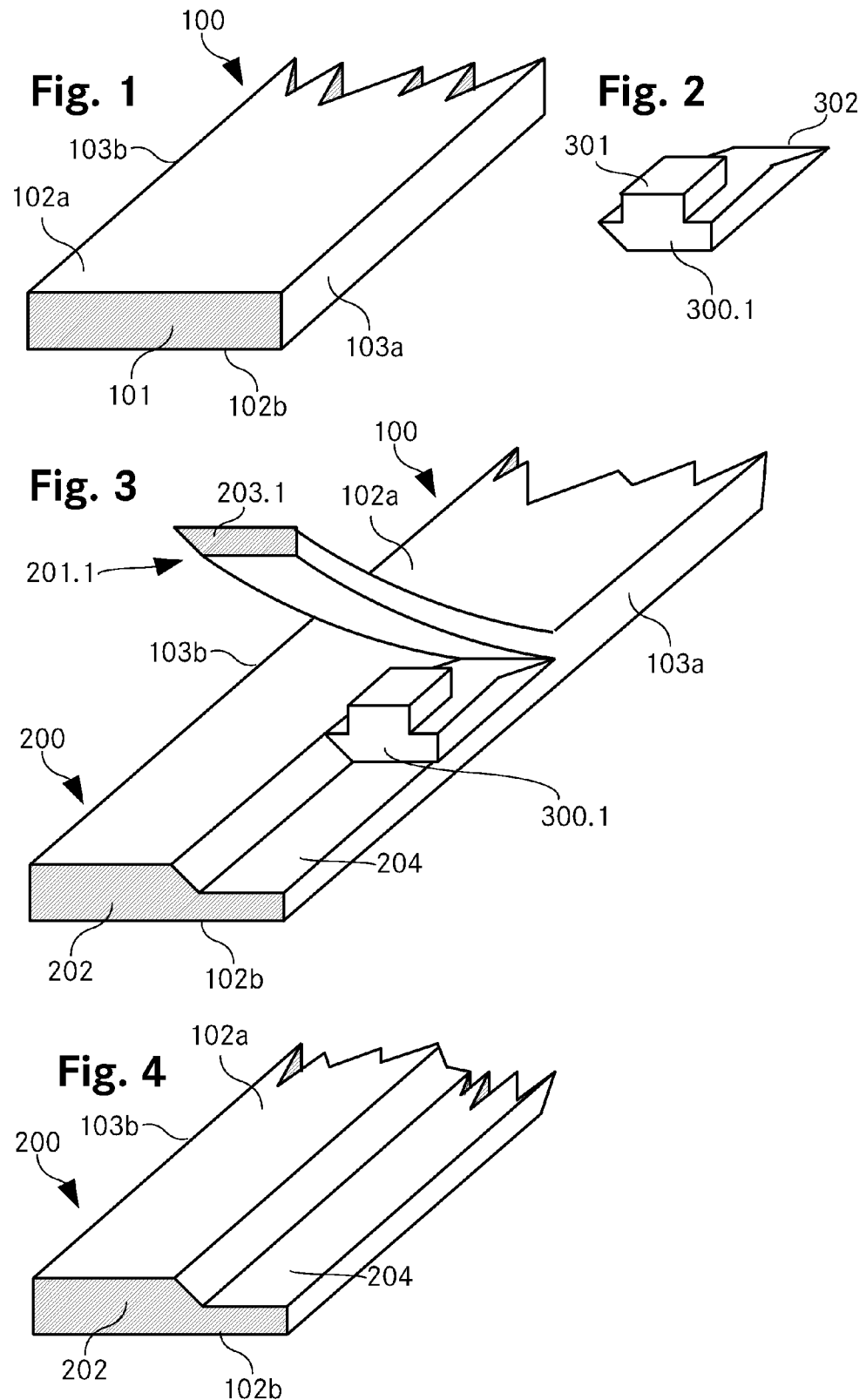

METHOD FOR PRODUCING DOCTOR BLADES

BACKGROUND OF THE INVENTION

1. Field of the Invention

The invention relates to a doctor blade and to a method for producing doctor blades from metal, the doctor blades to be produced having a reduced material thickness in a region of a working edge, the material thickness being essentially constant in this region.

2. Description of the Related Art

Doctor blades serve for distributing and wiping off liquid and pasty masses. They are used, inter alia, in packaging intaglio printing, illustrative and decorative intaglio printing, flexographic printing, UV flexographic printing, aniloxoffset, pad printing and rotary screenprinting, and also in coating methods. For example, in intaglio printing, the excess printing ink is wiped off from the bridges of the impression cylinder by means of a doctor blade in the region of a working edge, so that only the wells are filled with ink (scraping off). By contrast, in screenprinting, the doctor blade is used in order to press the printing ink through the orifices in the screen on to the print carrier. The doctor blade may be designed as a steel strip ground in the manner of a knife, but doctor blades made from plastic or composite materials are also known.

Doctor blades may be subdivided essentially into three groups on the basis of their cross-sectional profile:

1. Doctor blades of wedge form (wedge doctor blades) have a cross-sectional area in the form of a trapezium with two right angles. The working edge may in this case also be flattened or rounded.
2. Doctor blades with round edges have essentially a cross-sectional area in the form of a rectangle, the working edge being rounded.
3. Doctor blades with lamellae (lamellar doctor blades) have a cross-sectional area in the form of a rectangle with a cutout which is essentially rectangular and emanates from one corner, in which case the concave region of the lamellar doctor blade may be rounded and a working edge is usually rounded.

The profiling in lamellar doctor blades is typically achieved by means of a grinding operation, in which a cutting movement is generated as a result of a rotation of a cutting tool with respect to the chucked workpiece. The milling operation is followed by a remachining of the main surfaces, in order to eliminate the unevenesses which have arisen due to the milling operation. Remachining typically takes place by means of a polishing operation and/or lapping operation.

GB 1,289,609 relates to wear-resistant doctor blades. These comprise regions consisting of a hard material and regions consisting of a soft material. The metal doctor blade has on one side surface a long, flat and narrow recess which runs parallel to the working edge. The recess holds a strip of wear-resistant material, the hardness of which is higher than that of the surrounding material. The recess may be produced by planing, milling, grinding or forming.

US 2008/0096037 A1 relates to a steel strip for the production of doctor blades, the steel used having a composition of 1-3% by weight C, 4-10% by weight Cr, 1-8% by weight Mo, 2.5-10% by weight V and otherwise iron, and the steel strip being produced by means of a powder-metallurgical method. In the production of the doctor blades, the edges of the strip may be machined by planing and/or milling in order to obtain the desired edge profile.

DE-A 1 807 325 relates to a non-generic method for the production of doctor blades (in particular, paper-coating knives), which refers to doctor blades of wedge form. Their oblique surface is produced by planing in the longitudinal direction of the doctor blade. A better smoothness is thereby to be achieved, while at the same time the production costs can be lowered, as compared with conventional doctor blades which are machined by grinding and honing. It is especially important, according to the publication, that transverse grooves in the region of the working edge can be avoided by means of the planing. Preferably, machining by planing is carried out, with a single chip being lifted off, using a single hard-metal planing chisel. The surfaces adjacent to the oblique surface are also preferably machined in the longitudinal direction.

The known methods for the production of lamellar doctor blades having a region with a constantly reduced material thickness are slow and complicated.

What is needed, therefore, is an improved doctor blade and method and system for producing doctor blades.

SUMMARY OF THE INVENTION

The object of the invention is to provide a production method for doctor blades having a region with a constantly reduced material thickness, which production method belongs to the technical field initially mentioned and is efficient and cost-effective.

The solution for achieving the object is defined by the features of claim 1. According to the invention, a region with reduced material thickness is generated by means of a planing operation upon a basic body with an essentially constant material thickness.

Such a basic body preferably consists of metal, in particular of steel, although other materials cannot be ruled out. The form of the basic body corresponds essentially to a strip, the cross-sectional area of which preferably has a rectangular form at right angles to a longitudinal direction, although other forms of a cross-sectional area cannot be ruled out. For example, the cross-sectional area could be trapezoidal or else even triangular.

After the planing of the basic body, a doctor blade breadth is first obtained, which differs from the basic body essentially in the cross-sectional area. While the basic body typically has a rectangular cross-sectional area, the doctor blade breadth then has a rectangular cross-sectional area with a cutout in the region of a first corner of the basic body.

The cutout may be rectangular, but it may also have other forms. For example, the cutout may be trapezoidal, the trapezium having two right angles, and a longest side and a side which lies at right angles against the longest side matching with corresponding sides of the cross-sectional area of the unmachined basic body. Further, a rounding of the region of the first opposite corner may also be envisaged, in which case the rounding does not necessarily have to have the form of a segment of an arc of a circle, but, instead, may have any desired form. However, preferably, the form of the cutout is convex and has two edges which stand perpendicularly to one another and which are parallel to the original edges of the cross-sectional area of the basic body.

The doctor blades have many different possible dimensions. The basic bodies are usually present as 100 m rolls. A doctor blade preferably has a thickness of less than one millimeter, in particular of between 0.15 and 0.4 mm. The width of the doctor blade is preferably in the range of between 8 and 80 mm, preferably 1.1 to 1.7 mm of this relating to the lamella width. The lamella thickness is usually in the range of 50 to 150 μm. The deviation in straightness preferably lies below 0.6 mm over a doctor blade length of 3 m. These values indicate typical dimensions of a doctor blade, but do not rule out a situation where the method according to the invention may also be used for the production of doctor blades of other dimensions.

As a result of the production of the region with a constantly reduced material thickness by means of a single planing operation, a rapid and accurate production of doctor blades is achieved. A possible planing performance in this case is between 60 and 150 m/min.

In a preferred embodiment of the method, the planing operation is of such precision that a remachining of the main surfaces in the region of reduced material thickness becomes superfluous. Consequently, work steps, such as, for example, grinding and/or polishing of the main surface, may be omitted, with the result that time and therefore costs can be saved.

In particular, the remachining of the metal of the basic body may consequently be dispensed with, although any coatings are not ruled out. Depending on the field of use, however, it may be advantageous nevertheless to remachine the main surface. This may be especially when an unusually high precision of the main surface is required. In this case, however, coarser polishing operations may be omitted, as compared with conventional methods, with the result that the method according to the invention acquires even greater efficiency in comparison with the methods initially mentioned. On the other hand, the region of the working edge is preferably remachined, as described in detail below.

Preferably, by means of a single planing operation, in a basic body, a coherent region of reduced material thickness is generated, the extent of the region of reduced material thickness corresponding to the joint extent of the regions of reduced material thickness of two doctor blade breadths lying next to one another. After the planing operation, a separating operation takes place in the region of reduced material thickness, with the result that the doctor blade breadths lying next to one another are separated.

The doctor blade breadths therefore lie mirror-symmetrically opposite one another before the separating operation, that is to say the region of reduced material thickness is present as a coherent zone which can be generated by means of one plane and one planing operation. Consequently, in the case of two doctor blade breadths, the regions with a constantly reduced material thickness can be produced simultaneously by means of a single planing operation, as a result of which the efficiency of the method in this work step is virtually doubled.

For this purpose, the basic body has a width which corresponds to the sum of the widths of the doctor blade breadths to be produced. The situation cannot in this case be ruled out where the two doctor blade breadths to be produced have different widths. Preferably, however, the basic body has a constant thickness. It is conceivable, however, that the plane may be such that the lamella thickness of the doctor blade may differ. Preferably, however, the plane is such that the lamella thicknesses of the doctor blade breadths to be produced are identical.

The separation of the doctor blade breadths lying next to one another takes place after the planing operation, preferably in the middle of the region with a constantly reduced material thickness, in a longitudinal direction of the doctor blade breadths. Alternatively, the separation may also take place off-center in the region of reduced material thickness, so that doctor blade breadths having a different lamella width are produced.

In a further preferred embodiment, by means of a single planing operation, in a basic body, a plurality of coherent regions of reduced material thickness lying parallel to one another are generated. The extents of the individual regions in this case correspond to the joint extent of the regions of reduced material thickness in each case of two doctor blade breadths lying next to one another, as described above. After the planing operation, a separating operation takes place in the regions of reduced material thickness and also in the regions between the regions of reduced material thickness in each case in a longitudinal direction of the doctor blade breadths. The doctor blade breadths lying next to one another are thereby separated. By means of this method, a parallel production of a plurality of doctor blade breadths is made possible.

In order to make this method possible, preferably a plurality of planes are arranged in parallel and are connected to one another, so that only one plane guidance is necessary, or the planes are guided individually. In an arrangement of n planes, 2n doctor blade breadths can be produced. In contrast to the method described above, in this case, additionally (n−1) separating operations in the regions not of reduced material thickness must take place. The advantage of this method is that, during planing, the strip can be held more simply in a stable way with respect to possible torsions. During the additional separating operations in the regions not of reduced material thickness, particular care must be taken to ensure that the doctor blade breadths are not distorted.

The separating operation is preferably carried out by means of laser cutting.

Alternatively, the separating operation may also be carried out by means of sawing or cutting. It has been shown, however, that, as a result of laser cutting, the doctor blade breadths run less risk of being deformed, and therefore laser cutting is to be preferred as the separating method.

In a preferred method, the separating operation takes place in the same work step as the planing operation, that is to say the separating tool is arranged behind the planing tool, so that the two work steps can act upon the basic body in succession within the same holding and transport operation. A more efficient production of doctor blades can consequently be achieved. Alternatively, the work steps may also take place sequentially in two successively arranged machining stations.

Preferably, after the separating operation, the region of the working edge is remachined by means of one or more of the processes comprising rounding, grinding, lapping and polishing, in order to achieve the desired shaping and intended degree of quality of the working edge.

For lapping, in a way known per se, a suspension is used which consists of lapping powder (for example, aluminum oxide, silicon carbide, diamond) and of a liquid (for example, water or lapping oil).

Depending on the field of use and the quality requirements, one or more remachining processes of the working edge may even be dispensed with.

Preferably, rounding takes place by means of a further planing operation. Since a planing operation can be carried out relatively quickly, production time is consequently saved. Furthermore, consequently, if the planing operation can be carried out with sufficient precision, a further remachining of the working edge may be dispensed with, with the result that work steps and therefore, once again, time can be saved.

Alternatively, especially when a plurality of doctor blade breadths are to be produced by means of a planing operation and a separating operation, rounding may even take place subsequently. Depending on the thickness of the working edge, the machining of the working edge may take place either by means of a planing operation or a milling operation or by means of grinding, polishing/lapping.

In a preferred embodiment, the remachining of the working edge takes place even by means of the same planing operation by which the region of reduced material thickness is generated.

In a series production of doctor blades or when precisely one doctor blade breadth is produced by means of the planing operation, the plane is preferably such that the working edge is rounded by the same planing tool simultaneously with the production of the region of reduced material thickness.

Alternatively, the rounding of the working edge may take place after the production of the region of reduced material thickness, in which case the operations do not have to be carried out by the same method. For example, the production of the region of reduced material thickness may take place by planing, and the rounding of the working edge may take place by lapping, polishing or grinding.

In a preferred embodiment, the doctor blade is coated after the production of the lamella. Depending on the coating, therefore, the doctor blade can be adapted for individual fields of use. Especially in applications where the doctor blade comes into contact with acids or with similar substances attacking the metal, its useful life can be increased by means of a suitable coating. Furthermore, printing problems, such as bleach-outs (snotty noses), scumming and print streaks, can be markedly reduced.

Depending on the field of use, especially in use with non-corrosive substances, the coating may be even be dispensed with.

Preferably, the doctor blade consists of metal, in particular of steel, and is of essentially strip-shaped form, a cross section with respect to a longitudinal direction having a, for example rectangular, edge cutout.

Further advantageous embodiments and feature combinations of the invention may be gathered from the following detailed description and from the whole of the patent claims.

BRIEF DESCRIPTION OF THE ACCOMPANYING DRAWINGS

In the drawings used for explaining the exemplary embodiment:

FIG. 1 shows a diagrammatic view of a basic body;

FIG. 2 shows a diagrammatic view of a plane,

FIG. 3 shows a diagrammatic illustration of the flow of a planing operation upon a basic body;

FIG. 4 shows a diagrammatic view of a doctor blade breadth;

In principal, identical parts are given the same reference symbols in the figures.

DESCRIPTION OF ONE ILLUSTRATIVE EMBODIMENT

Figure 5:
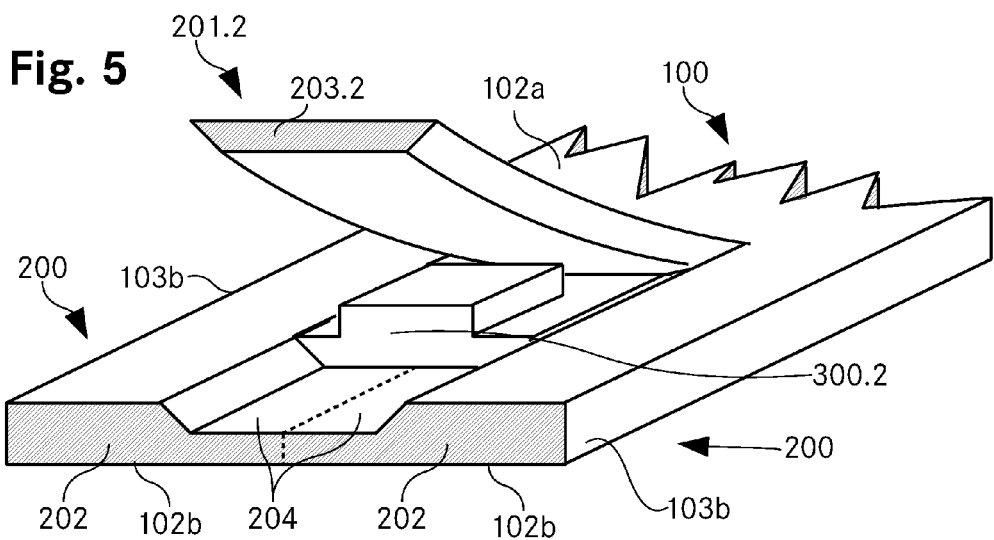
FIG. 5 shows a diagrammatic illustration of the flow of a planing operation upon a basic body, two doctor blade breadths being planed at once by means of one planing operation.

FIG. 1 shows diagrammatically a basic body 100 made from steel, which serves as an initial product for producing the doctor blade. The basic body 100 is of strip-like form and has, at right angles to a longitudinal direction of the basic body 100, a cross-sectional area 101 in the form of a rectangle, that is to say the basic body 100 is formed as a straight prism. To indicate the strip-like form of the basic body 100, the cross-sectional area 101 is hatched, and, as an indication of the actually very long length of the basic body 100, the opposite side is illustrated frayed, as it is also in the following figures. The dimensions of the basic body 100, in particular the height/width ratio of the cross-sectional area 101, are illustrated out of shape for the sake of clarity. The effective ratio between the height and width of the cross-sectional area 101 of the basic body 100 lies approximately in the range of 1:50 to 1:200. The basic body 100 consequently has two side surfaces 103a, 103b which, in this exemplary embodiment, in each case stand perpendicularly to two main surfaces 102a, 102b, the side surfaces 103a, 103b and the main surfaces 102a, 102b being in each case parallel to one another.

FIG. 2 illustrates diagrammatically a plane 300.1 for the method according to the invention. This comprises a guide element 301 for guiding it and also a cutting edge 302 for the machining of the basic body 100. The cutting edge 302 is essentially straight, but, depending on the form of the desired doctor blade breadth 200, has in the marginal region a shaped portion which makes it possible to profile the marginal region of the region of reduced material thickness 204 to be produced. A cross section of the plane 300.1 at right angles to the direction of guidance has, in the embodiment illustrated, a cross-sectional area in the form of a trapezium with two right angles, the working edges for the planing operation being formed by a first side, which is not connected to the other sides at right angles, and by a further, shorter side of the two sides which is contiguous to the first side.

Three preferred methods for the production of doctor blade breadths are explained by means of the following FIGS. 3-8.

FIG. 3 illustrates diagrammatically a planing operation upon a basic body 100 by means of a plane 300.1, as a result of which a doctor blade breadth 200 is produced. For this purpose, the plane 300.1 is applied parallel to a main surface 102a and contiguously to a side surface 103a of the basic body 100 and planes off a chip 201.1 in a longitudinal direction of the basic body 100. In the present embodiment, the chip 201.1 has a quadrangular cross-sectional area 203.1, in each case a right angle being present at two adjacent corners of one side, and a corner which does not match with an edge of the cross-sectional area 202 of the basic body 100 having an obtuse angle and a corner which has an acute angle matching with an edge of the main surface 102a of the unmachined basic body 100.

FIG. 4 shows a doctor blade breadth 200 with a region of reduced material thickness 204 which is in the form of a straight prism, the cross-sectional area 202 of the doctor blade breadth 200 having an above-described quadrangular cutout. That surface of the region of reduced material thickness 204 which is parallel to the main surface 102a is preferably not remachined. The working edge is subsequently finished (see below) by means of a machining of the marginal region, in the present example by means of a planing operation upon the region of reduced material thickness.

FIG. 5 illustrates as a further preferred exemplary embodiment a planing operation upon a basic body, by means of which regions of reduced material thickness 204 for two doctor blade breadths can be produced simultaneously. For this purpose, the plane 300.2 has a width which corresponds to the joint region of reduced material thickness 204 of two doctor blade breadths 200. For this purpose, the plane 300.2 has in the marginal regions a form which corresponds to the desired profilings of the regions of reduced material thickness 204 and which corresponds essentially to the form of two connected planes 300.1 described above, the second plane 300.1 being designed mirror-symmetrically with respect to the first plane 300.1, with the result that a cross-sectional area of the connected plane 300.1 or of the plane 300.2 has the form of an equilateral trapezium. The plane 300.2 is applied to the basic body 100 parallel to a main surface 102a and contiguously to a side surface 103a of the basic body 100 and planes off a chip 201.2 in a longitudinal direction of the basic body 100. In the present embodiment, the chip 201.2 has an equilateral trapezoidal cross-sectional area 203.2, a longer side of the trapezoidal cross-sectional area 203.2 matching with a longer edge of the cross-sectional area 101 of the unmachined basic body 100. The dotted line in the regions of reduced material thickness 204 indicates where the subsequent separating operation is to be carried out.

Figure 6:
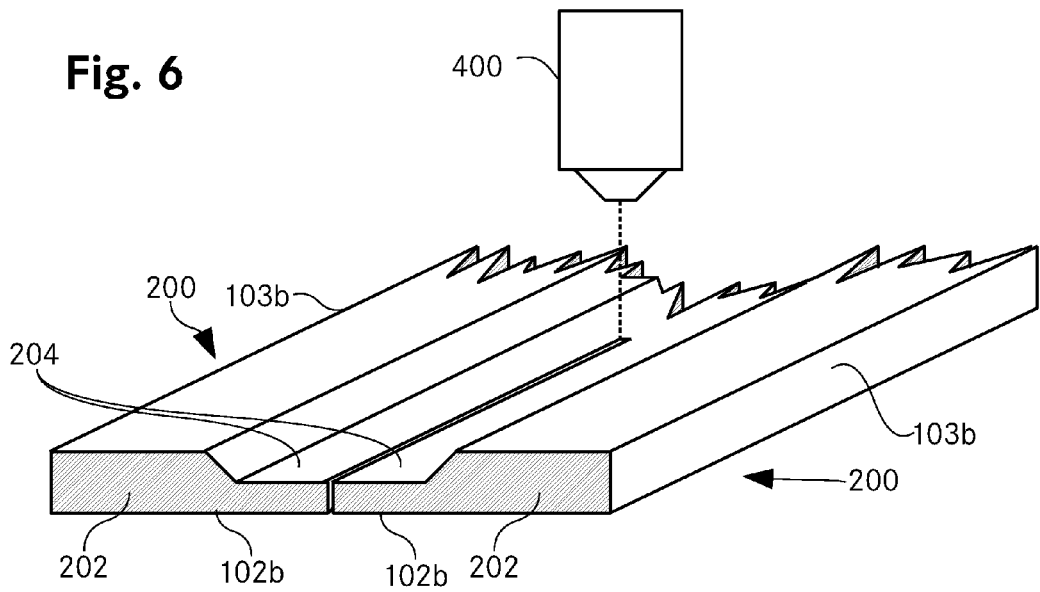
FIG. 6 shows a diagrammatic illustration of a laser cutting operation for separating a planed basic body into two doctor blade breadths.

FIG. 6 illustrates the separating operation by means of which the doctor blade breadths 200 are separated. A laser or water jet 400 is preferably used for this purpose, in order to achieve rapid and precise separation and to prevent the doctor blade breadths 200 from being distorted during the separating operation.

Figure 7:
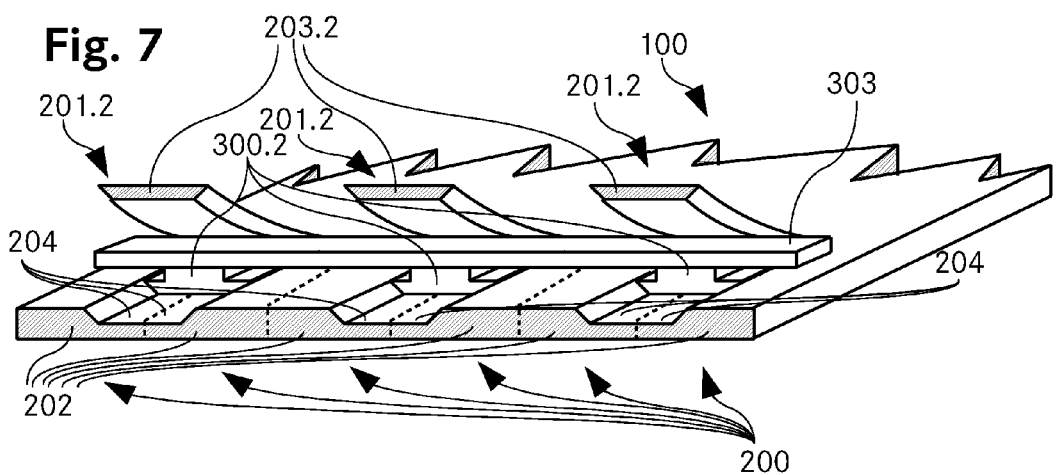
FIG. 7 shows a diagrammatic illustration of a flow of a planing operation upon a basic body, six doctor blade breadths being planed at once by means of a planing operation using three connected planes.

FIG. 7 illustrates diagrammatically, as a further preferred embodiment, a planing operation by means of which regions of reduced material thickness of a plurality of doctor blade breadths 200 can be produced by means of one planing operation. For this purpose, a plurality of planes are connected via a connecting element 303 such that they can be actuated in parallel by means of a guide (three planes are illustrated by way of example in the figure, but two or more than three may also be used simultaneously). The connected planes 300.2 are applied to the basic body 100 parallel to a main surface 102a and contiguously to a side surface 103a of the basic body 100 and plane off a plurality of chips 201.2 in a longitudinal direction of the basic body 100. In the present embodiment, the chips 201.2 are identical to one another and again have an equilateral trapezoidal cross-sectional area 203.2, a longer side of the trapezoidal cross-sectional area 203.2 matching with a longer edge of the cross-sectional area 101 of the unmachined basic body 100. After the planing operation, the doctor blade breadths 200 are connected to one another in the regions of reduced material thickness 204 and, with the exception of the two marginal doctor blade breadths 200, are connected to one another in the regions not of reduced material thickness. In FIG. 7, these regions are marked by dotted lines which at the same time indicate where the subsequent separating operation takes place. Here, too, the separating operation is preferably carried out by means of a laser (not illustrated).

Figure 8:
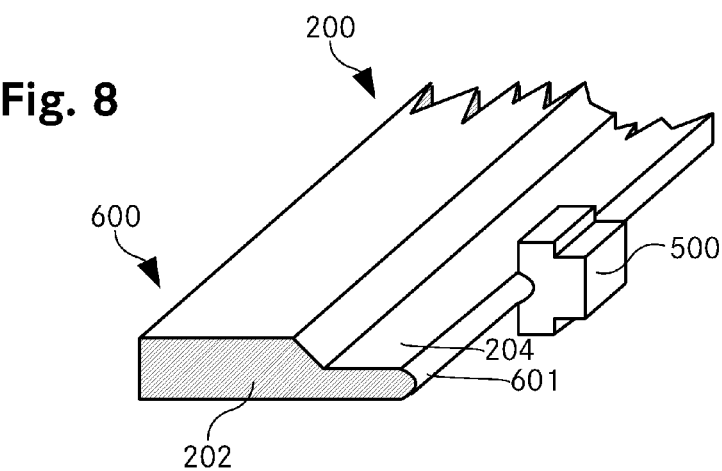
FIG. 8 shows a diagrammatic illustration of the flow of a planing operation for producing the working edge of a doctor blade breadth.

The production of the region of reduced material thickness 204 is usually followed by a machining of the working edge. This may take place by means of planing, lapping, grinding or milling. FIG. 8 illustrates as an example the machining of the working edge 601 by means of a plane 500. The plane 500 has a semicircular form in a working region, other forms, such as, for example, a wedge form or the like, also being conceivable. The plane 500 is applied in the marginal region of the region of reduced material thickness 204 and again planes in a longitudinal direction of the doctor blade breadth 200.

Figure 9:
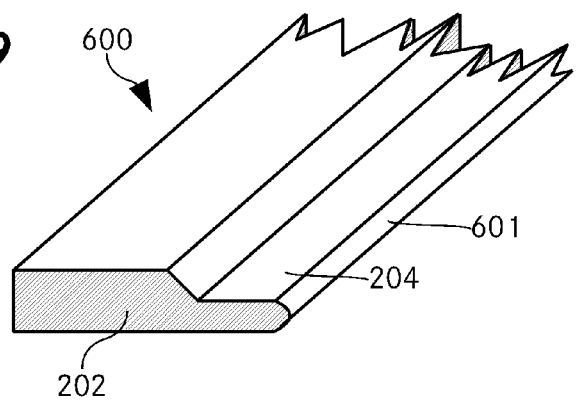
FIG. 9 shows a diagrammatic view of a further doctor blade.

FIG. 9 shows a doctor blade 600 with a cross-sectional area 202, with a region of reduced material thickness 204 and with a rounded working edge 601. Depending on the field of use, the doctor blade 600 is finished in the depicted form. On the other hand, a remachining, such as, for example, in the form of a polishing or coating, cannot be ruled out.

In summary, it is to be found that, by virtue of the method according to the invention, doctor blades can be produced efficiently and, moreover, cost-effectively.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. A method for producing two metal doctor blades that are suitable and adapted for distributing and wiping off a liquid or a paste from a cylinder, the two metal doctor blades each providing an area of reduced material thickness and each providing a working edge, the material thickness being constant in the area of reduced material thickness, wherein said method comprises:
   a step of providing both areas of reduced material thickness by performing a single planing operation in a basic body;
   wherein the basic body is provided having a constant material thickness over its extent;
   wherein the single planing operation in the basic body simultaneously forms both areas of reduced material thickness;
   wherein the extent of the formed area of reduced material thickness provides an amount of material, having a reduced thickness, necessary to form the two metal doctor blades;
   a second step after the single planing operation, of performing a separating operation;
   wherein the separating operation includes separating, by cutting, the basic body, having the area of reduced material thickness, in the area of the reduced material thickness;
   wherein the two metal doctor blades and the two working edges are formed by the separating operation; and
   wherein the two metal doctor blades are suitable and adapted for distributing and wiping off a liquid or a paste from a cylinder.

2. The method according to claim 1, wherein the single planing operation also forms a surface that is perpendicular to the two working edges; and
   wherein after the step of performing the single planing operation, no additional machining of the surface that is perpendicular to the two working edges is performed.

3. The method according to claim 1, wherein the single planing operation also forms a surface that is perpendicular to the two working edges; and
   after the step of performing the single planing operation, machining the surface that is perpendicular to the two working edges by at least one of or a combination of rounding, lapping and polishing.

4. The method according to claim 3, wherein after the separating step the two working edges are machined by performing a second planing operation.

5. The method according to claim 1, wherein the two metal doctor blades are coated.

6. The method according to claim 1, wherein the cutting is performed using a sawing, laser or water jet cutting means.

7. A method for producing a plurality of metal doctor blades that are suitable and adapted for distributing and wiping off a liquid or a paste from a cylinder, the plurality of metal doctor blades each providing an area of reduced material thickness and each providing a working edge, the material thickness being constant in the area of reduced material thickness, wherein said method comprises:
- a step of providing the plurality of areas of reduced material thickness by performing a single planing operation in a basic body;
- wherein the basic body is provided having a constant material thickness over its Extent;
- wherein the single planing operation in the basic body simultaneously forms the areas of reduced material thickness;
- wherein the extent of the formed areas of reduced material thickness provides an amount of material, having a reduced thickness, necessary to form the plurality of metal doctor blades;
- a second step after the single planing operation, of performing a separating operation;
- wherein the separating operation includes separating, by cutting, the basic body, having the areas of reduced material thickness, in the areas of the reduced material thickness;
- wherein the plurality of metal doctor blades and plurality of working edges are formed by the separating operation; and
- wherein at least one of the plurality of metal doctor blades are suitable for distributing and wiping off a liquid or a paste from a cylinder.

8. The method according to claim 7, wherein the single planing operation also forms a plurality of surfaces that are perpendicular to the working edges; and
- wherein after the step of performing the single planing operation, no additional machining of the surfaces that are perpendicular to the working edges is performed.

9. The method according to claim 7, wherein the single planing operation also forms a plurality of surfaces that are perpendicular to the working edges; and
- after the step of performing the single planing operation, machining the surfaces that are perpendicular to the working edges by at least one of or a combination of rounding, lapping and polishing.

10. The method according to claim 9, wherein after the separating step the working edges are machined by performing a second planing operation.

11. The method according to claim 7, wherein the plurality of metal doctor blades are coated.

12. The method according to claim 7, wherein the cutting is performed using a sawing, laser or water jet cutting means.

* * * * *